United States Patent
Wang (10) Patent No.: US 8,897,339 B2
(45) Date of Patent: Nov. 25, 2014

(54) METHOD AND ARRANGEMENT OF INCREASING IMPAIRMENT CO-VARIANCE MATRIX ESTIMATION ACCURACY

(75) Inventor: Hai Wang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/642,116

(22) PCT Filed: Apr. 20, 2010

(86) PCT No.: PCT/CN2010/000536
§ 371 (c)(1),
(2), (4) Date: Oct. 18, 2012

(87) PCT Pub. No.: WO2011/130873
PCT Pub. Date: Oct. 27, 2011

(65) Prior Publication Data
US 2013/0039389 A1    Feb. 14, 2013

(51) Int. Cl.
*H04B 1/00*   (2006.01)
*H04B 1/712*  (2011.01)

(52) U.S. Cl.
CPC .... *H04B 1/712* (2013.01); *H04B 2201/709727* (2013.01)
USPC ......................................................... 375/148

(58) Field of Classification Search
CPC .......................................... H04B 2201/709727
USPC ......................................................... 375/148
See application file for complete search history.

(56) References Cited

U.S. PATENT DOCUMENTS

| | | | |
|---|---|---|---|
| 7,536,158 B2* | 5/2009 | Bottomley et al. | 455/135 |
| 2005/0215218 A1* | 9/2005 | Bottomley et al. | 455/226.1 |
| 2008/0291887 A1 | 11/2008 | Cairns | |
| 2009/0198629 A1* | 8/2009 | De Prisco et al. | 705/36 R |

(Continued)

FOREIGN PATENT DOCUMENTS

| | | |
|---|---|---|
| CN | 1957540 A | 5/2007 |
| WO | 0035129 A2 | 6/2000 |
| WO | 201004388 A2 | 1/2010 |

OTHER PUBLICATIONS

Notification Concerning Transmittal of the International Preliminary Report on Patentability and Written Opinion of the International Searching Authority issued on Nov. 1, 2012 in corresponding International Application No. PCT/CN2010/000536, 6 pages.

*Primary Examiner* — Santiago Garcia
(74) *Attorney, Agent, or Firm* — Rothwell, Figg, Ernst & Manbeck, P.C.

(57) ABSTRACT

A method and arrangement of increasing impairment co-variance matrix $R_u$ estimation accuracy in downlink in a user equipment in a communication network system. De-spread is performed on HS-DSCH symbols to form a matrix X of de-spread symbols. The matrix X and channel estimates $h_c$ from CPiCH and modulation scheme information are used to form a matrix S of recovered symbols in hard value. The matrix X and the channel estimates $h_c$, the modulation scheme information and the matrix S output are used to increase the estimation accuracy of the matrix S. The previous step is repeated until the output symbols are the same as the input symbols or the number of iterations reaches a pre-defined maximum value. The matrix X and the matrix S with increased estimation accuracy are used to form an impairment co-variance matrix $R_u$ estimate.

17 Claims, 3 Drawing Sheets

(56) References Cited

U.S. PATENT DOCUMENTS

2010/0117897 A1* 5/2010 Riley et al. .............. 342/357.09
2010/0138222 A1* 6/2010 Herbig et al. ................. 704/243
2010/0197330 A1* 8/2010 Astely et al. .................. 455/507

* cited by examiner

METHOD AND ARRANGEMENT OF INCREASING IMPAIRMENT CO-VARIANCE MATRIX ESTIMATION ACCURACY

CROSS REFERENCE TO RELATED APPLICATION(S)

This application is a 35 U.S.C. §371 National Phase Entry Application from PCT/CN2010/000536, filed Apr. 20, 2010, designating the United States, the disclosure of which is incorporated herein in its entirety by reference.

TECHNICAL FIELD

The present invention relates to a method and arrangement of increasing impairment co-variance matrix estimation accuracy in downlink in a user equipment in a communication network system.

BACKGROUND

RAKE receivers are well known in the communication arts and find widespread use in Code Division Multiple Access (CDMA) systems, such as in IS-95, IS-2000 (cdma2000), and Wideband CDMA (WCDMA) wireless communication networks. The name derives from the rake-like appearance of such receivers, wherein multiple, parallel receiver fingers are used to receive multiple signal images in a received multipath signal. By coherently combining the finger outputs in a RAKE combiner, the conventional RAKE receiver can use multipath reception to improve the Signal-to-Noise Ratio (SNR) of the received multipath signal.

Generalized RAKE (G-RAKE), or chip level equalizer, is an enhancement of the traditional RAKE receiver in a CDMA system. To cope with sudden changes in the interference, it is highly desirable to have a G-RAKE at each time slot and not to rely on cross-slot average. The difficulty is the estimation of the impairment co-variance matrix, i.e. the so-called Ru matrix.

In uplink, non-parametric G-RAKE employs un-used Walsh codes to estimate the impairment co-variance matrix, which leads to extremely good performance close to an ideal G-RAKE. The Walsh code tree structure in uplink implies that there always exist a number of un-used Walsh codes and the network knows them.

Walsh Code is a group of spreading codes having good autocorrelation properties and poor crosscorrelation properties. Walsh codes are the backbone of CDMA systems and are used to develop the individual channels in CDMA. For IS-95, there are 64 codes available. Code 0 is used as the pilot and code 32 is used for synchronization. Codes 1 though 7 are used for control channels, and the remaining codes are available for traffic channels. Codes 2 through 7 are also available for traffic channels if they are not needed. For cdma2000, there exists a multitude of Walsh codes that vary in length to accommodate the different data rates and Spreading Factors of the different Radio Configurations.

The information of complete downlink Walsh code allocation is not available to User Equipment (UE), moreover Walsh codes might be fully occupied by High Speed Downlink Packet Access (HSDPA), Release 99 (R99) and control channels and left no available un-used Walsh codes. Thereby UE cannot rely on un-used Walsh codes to estimate the impairment co-variance matrix. Instead, it uses either Common Pilot Channel (CPiCH), which is a commonly used method but very noisy, or potentially some data covariance or data-aided methods. So far there has been no sufficiently robust product algorithm proposal developed.

In downlink, G-RAKE is primarily intended for the reception of High Speed-Downlink Shared Channel (HS-DSCH), which is always associated with a High Speed-Shared Control Channel (HS-SCCH). HS-SCCH carries scheduling information like: 1) UE ID; 2) HS-DSCH transport format including Walsh code set (starting node and number of codes), modulation scheme and transport block size; 3) hybrid-ARQ-related parameters. The timing relation between HS-SCCH and HS-DSCH ensures that information like Walsh code set and modulation scheme is available for HS-DSCH on-the-fly demodulation. The structure of HS-SCCH limits the scheduling information only available to the intended UE, i.e. a UE which is not scheduled has no access to this information.

Since un-used Walsh codes are not available in downlink, a practical solution would be to have a parametric G-RAKE based on CPiCH, but it would not perform very well especially at high geometry (>15 dB), or to build a non-parametric G-RAKE for low mobile speed in order to allow for cross-slot average, which becomes an issue when facing sudden changes of interference, or to build a Minimum Mean Square Error (MMSE) G-RAKE or chip-level equalizer, but it can have catastrophic performance at high Signal to Interference-plus-Noise Ratio (SINR) regions, especially for Higher Order Modulation (HOM) like 16QAM (Quadrature amplitude modulation).

In order to overcome the shortage of number of pilots, 10 symbols per time slot, in the impairment co-variance estimation, US2009310715 proposes to use "soft pilots", which are "constant envelope" modulation symbols, for example Binary Phase Shift Keying (BPSK) or Quadrature Phase Shift Keying (QPSK), with higher reliability than others. A two-pass G-RAKE is proposed, where the 1st pass employs MMSE G-RAKE to recover "soft pilots" and the 2nd pass uses them to estimate the impairment co-variance matrix and form combining weights to recover all the traffic data. However, it was found that the performance leaves room for further improvement. So far this desire remains very challenging to be met.

SUMMARY

Accordingly, one objective with embodiments of the present invention is to provide a method, an arrangement and a user equipment in a communication network node of achieving robust G-RAKE performance, close to an ideal one, in downlink at high geometry for moderate to high mobile speed, which does not rely on cross-slot averages, in order to offer increased peak data rate.

According to a first aspect of embodiments of the present invention this objective is achieved through a method as defined in claim 1, which specifies a method of increasing impairment co-variance matrix $R_u$ estimation accuracy in downlink in a user equipment in a communication network system comprising a plurality of communication network nodes communicating with one or more user equipments, where each network node is serving at least one cell in which the user equipments are situated. The method comprises the steps of: performing de-spread on HS-DSCH symbols to form a matrix X of de-spread symbols; using the matrix X of de-spread symbols and channel estimates $h_c$ from CPiCH and modulation scheme information to form a matrix S of recovered symbols in hard value; using the matrix X of de-spread symbols and the channel estimates $h_c$ from CPiCH, the modulation scheme information and the matrix S of recovered symbols in hard value output from the previous step to increase the estimation accuracy of the matrix S of recovered symbols in hard value; repeating the previous step until the output symbols are the same as the input symbols or the number of iterations reaches a pre-defined maximum value; using the matrix X of de-spread symbols and the matrix S of recovered symbols in hard value with increased estimation accuracy to form an impairment co-variance matrix $R_u$ estimate; using the impairment co-variance matrix $R_u$ estimate and the channel estimates $h_c$ from CPiCH to determine G-RAKE combining weight w and to estimate CPiCH SINR.

According to a second aspect of embodiments of the present invention this objective is achieved through an arrangement as defined in claim 9, which specifies an arrangement of increasing impairment co-variance matrix $R_u$ estimation accuracy in downlink in a user equipment in a communication network system comprising a plurality of communication network nodes communicating with one or more user equipments, where each network node is serving at least one cell in which the user equipments are situated. The arrangement comprises: plural delay fingers configured to perform de-spread on High Speed-Downlink Shared Channel symbols to obtain de-spread symbols and a generator configured to form a matrix X of the obtained de-spread symbols; a processor for using the matrix X of de-spread symbols and channel estimates $h_c$ from Common Pilot Channel and modulation scheme information to form a matrix S of recovered symbols in hard value; said processor further being arranged for using the matrix X of de-spread symbols and the channel estimates $h_c$ from Common Pilot Channel, the modulation scheme information and the matrix S of recovered symbols in hard value output from the previous step to increase the estimation accuracy of the matrix S of recovered symbols in hard value; said processor further being arranged for repeating the step of using the matrix X of de-spread symbols and the channel estimates $h_c$ from Common Pilot Channel, the modulation scheme information and the matrix S of recovered symbols in hard value output from the previous step to increase the estimation accuracy of the matrix S of recovered symbols in hard value until the output symbols are the same as the input symbols or the number of iterations reaches a pre-defined maximum value; a generator configured to use the matrix X of de-spread symbols and the matrix S of recovered symbols in hard value with increased estimation accuracy to form an impairment co-variance matrix $R_u$ estimate; and said processor further being arranged for using the impairment co-variance matrix $R_u$ estimate and the channel estimates $h_c$ from Common Pilot Channel to determine Generalized RAKE combining weight w and to estimate Common Pilot Channel Signal to Interference-plus-Noise Ratio.

According to a third aspect of embodiments of the present invention this objective is achieved through a user equipment as defined in claim 1, which specifies a user equipment for increasing impairment co-variance matrix $R_u$ estimation accuracy in downlink in a communication network system comprising communication network nodes each serving at least one cell in which the user equipments are situated. The user equipment comprises: plural delay fingers configured to perform de-spread on High Speed-Downlink Shared Channel symbols to obtain de-spread symbols and a generator configured to form a matrix X of the obtained de-spread symbols; a processor for using the matrix X of de-spread symbols and channel estimates $h_c$ from Common Pilot Channel and modulation scheme information to form a matrix S of recovered symbols in hard value; said processor further being arranged for using the matrix X of de-spread symbols and the channel estimates $h_c$ from Common Pilot Channel, the modulation scheme information and the matrix S of recovered symbols in hard value output from the previous step to increase the estimation accuracy of the matrix S of recovered symbols in hard value; said processor further being arranged for repeating the step of using the matrix X of de-spread symbols and the channel estimates $h_c$ from Common Pilot Channel, the modulation scheme information and the matrix S of recovered symbols in hard value output from the previous step to increase the estimation accuracy of the matrix S of recovered symbols in hard value until the output symbols are the same as the input symbols or the number of iterations reaches a pre-defined maximum value; a generator configured to use the matrix X of de-spread symbols and the matrix S of recovered symbols in hard value with increased estimation accuracy to form an impairment co-variance matrix $R_u$ estimate; and said processor further being arranged for using the impairment co-variance matrix $R_u$ estimate and the channel estimates $h_c$ from Common Pilot Channel to determine Generalized RAKE combining weight w and to estimate Common Pilot Channel Signal to Interference-plus-Noise Ratio.

Further embodiments are listed in the dependent claims.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a better understanding, reference is made to the following drawings and preferred embodiments of the invention. In the drawings, wherein like reference characters denote similar elements throughout the several views.

DETAILED DESCRIPTION

Figure 1:
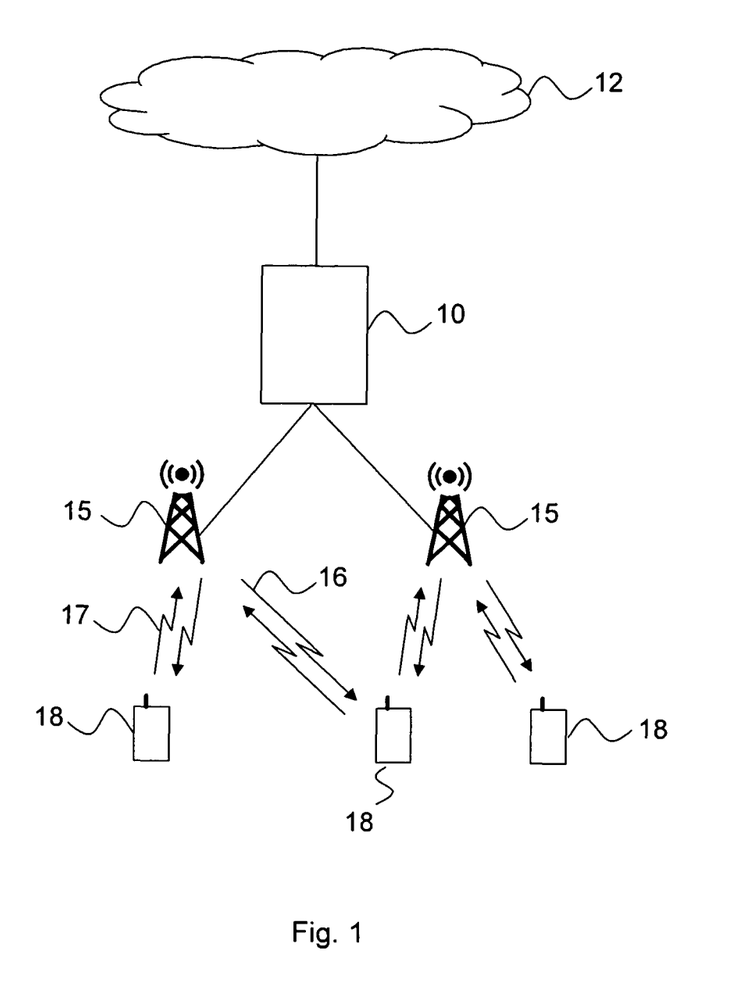
FIG. 1 is an exemplary communication network architecture, in which a mobile terminal includes a receiver circuit configured according to the arrangement of the present invention.

FIG. 1 depicts an exemplary communication system, in which a mobile terminal/mobile user equipment unit (UE) includes an arrangement for performing a method according to the present invention.

The communication system includes a radio access network (RAN), such as the UMTS terrestrial radio access network (UTRAN) architecture, comprising at least one radio base station (RBS) (eNode B or Node B) 15 (two are shown in FIG. 1) connected to one or more radio network controllers (RNCs) 10. The RAN is connected to a core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and downlink channel denoted 16. On the downlink channel 16, the RBS 15 transmits data to each user equipment 18 at a respective power level. On the uplink channel 17, the user equipments 18 transmit data to the RBS 15 at respective power levels.

According to a preferred embodiment of the present invention, the communication system is herein described as a WCDMA communication system. The skilled person, however, realizes that the inventive method and arrangement works very well on other communications systems as well, such as GSM and LTE. The user equipments 18 may be mobile stations such as mobile telephones ("cellular" telephones) and laptop computers with mobile termination and thus may be, for example, portable, pocket, hand-held, computer-included, or car-mounted mobile devices which communicate voice and/or data with the RAN.

The RAN covers a geographical area which is divided into cell areas, with each cell area being served by a RBS 15. A cell is a geographical area where radio coverage is provided by the RBS 15 equipment at a base station site. Each cell is identified by a unique identity within the local radio area, which is broadcast in the cell. The base stations 15 communicate over the air interface (e.g., radio frequencies) with the user equipment units 18 within range of the base stations 15. In the radio access network, several base stations are typically connected (e.g., by landlines or microwave) to the RNC 10. The RNC 10, also sometimes termed a base station controller (BSC), supervises and coordinates various activities of the plural base stations 15 connected thereto. The RNCs 10 are typically connected to one or more core networks 12.

This invention introduces an iterative method to do data aided impairment co-variance estimation to increases the estimation accuracy. This invention is a pure User Equipment (UE) implementation idea and does not require any standard change.

Parametric computation of an impairment covariance matrix $R_u$ is described, e.g. by, Cairns et al., Method and apparatus for parameter estimation in a Generalized RAKE receiver, PCT/EP2005/002419, which is incorporated herein by reference in its entirety. The impairment covariance matrix is also used to estimate signal quality, such as SINR, using for example $$SINR = h_c^H R_u^{-1} h_c$$

where superscript H denotes Hermitian transpose and $h_c$ is the channel estimates from CPiCH.

Determining the impairment covariance matrix is typically a prerequisite to generating a proper set of combining weights w.

HS-DSCH symbols, not necessarily the "soft pilots" like in the prior art document US2009310715, are demodulated and employed to estimate the impairment co-variance. The general idea of data aided impairment co-variance estimation, as such, is not new. However, the invention of this idea is an iterative method that increases the estimation accuracy.

HS-SCCH contains Walsh code allocation and modulation scheme for HS-DSCH on-the-fly demodulation. Modulation scheme information is employed to convert received HS-DSCH data symbols from soft values to hard values, with unit average symbol energy. In the case of QPSK $$s = u2s(u)$$
$$= (\text{sign}(\text{real}(u)) + j \cdot \text{sign}(\text{imag}(u)))/\sqrt{2}$$

To increase the accuracy of the detected data symbols, RAKE (otherwise MMSE G-RAKE) is deployed in the initial stage and followed by multi-stage G-RAKE. At any stage if the output symbols are the same as the input symbols or the number of iterations reaches a pre-defined maximum value, the remaining stages are skipped. The exact maximum number of stages needs fine tuning to reach a balance between performance and complexity.

HS-DSCH are de-spread first, then symbols corresponding to a few or all allocated Walsh codes are employed for the estimation of impairment co-variance.

X is the matrix of de-spread symbols with dimension of L-by-N.

$h_c$ is the channel estimates from CPiCH with dimension of L-by-1.

L is the number of combining fingers (from different delays and receiving antennas).

N=160×K is the number of de-spread symbols on each combining finger during one time slot, where 160 is the number of symbols per code channel in one time slot and K is the number of codes employed for estimation.

The exact number of employed codes needs fine tuning to reach a balance between performance and complexity. As an example, $K=N_{code}$, i.e. all allocated codes are employed.

The final output $R_u$ is used to determine G-RAKE combining weight w and to estimate CPiCH SINR according to:

$$w = R_u^{-1} h_c$$

$$SINR_{cpich} = \frac{SF_{cpich}}{SF} \cdot h_c^H R_u^{-1} h_c = 16 \cdot h_c^H R_u^{-1} h_c$$

where SF is the Spreading Factor, superscript H denotes Hermitian transpose and $h_c$ is the channel estimates from CPiCH.

According to embodiments of the present invention is proposed a method which targets to improve robust G-RAKE performance in downlink at high geometry for moderate to high mobile speed in order to offer increased peak data rate.

Figure 2:
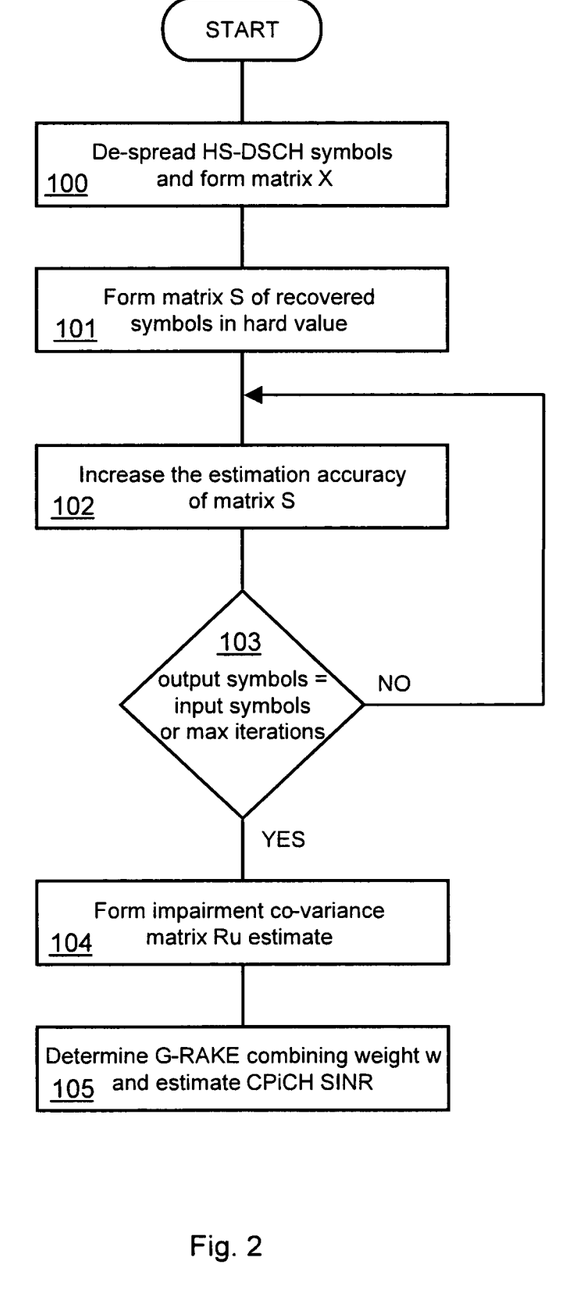
FIG. 2 is a diagram of the method of increasing impairment co-variance matrix estimation accuracy according to the present invention.

In accordance with a first embodiment this is provided by a method of increasing impairment co-variance matrix $R_u$ estimation accuracy in downlink in a user equipment 18 in a communication network system comprising a plurality of communication network nodes 15a, 15b communicating with one or more user equipments 18, where each network node 15a, 15b is serving at least one cell 19 in which the user equipments 18 are situated. The method comprises the steps of: performing de-spread on HS-DSCH symbols to form a matrix X of de-spread symbols 100; using the matrix X of de-spread symbols and channel estimates $h_c$ from CPiCH and modulation scheme information to form a matrix S of recovered symbols in hard value (i.e. unit average symbol energy) 101; using the matrix X of de-spread symbols and the channel estimates $h_c$ from CPiCH, the modulation scheme information and the matrix S of recovered symbols in hard value output from the previous step to increase the estimation accuracy of the matrix S of recovered symbols in hard value 102; repeating the previous step until the output symbols are the same as the input symbols or the number of iterations reaches a pre-defined maximum value 103; using the matrix X of de-spread symbols and the matrix S of recovered symbols in hard value with increased estimation accuracy to form an impairment co-variance matrix $R_u$ estimate 104; using the impairment co-variance matrix $R_u$ estimate and the channel estimates $h_c$ from CPiCH to determine G-RAKE combining weight w and to estimate CPiCH SINR 105.

In one embodiment the matrix X of de-spread symbols has a dimension of L-by-N, where L is the number of combining fingers and N is the number of de-spread symbols on each combining finger during one time slot.

In a further embodiment the number of de-spread symbols on each combining finger during one time slot N=160×K, where 160 is the number of symbols per code channel in one time slot and K is the number of codes employed for estimation.

In yet one embodiment the number of codes employed for estimation K=$N_{code}$, such that all allocated codes are employed for estimation.

In a still further embodiment symbols corresponding to a few or all allocated Walsh codes are used to form the matrix X of de-spread symbols.

In a yet further embodiment the step 101 of using the matrix X of de-spread symbols and channel estimates $h_c$ from Common Pilot Channel and the modulation scheme information to form a matrix S of recovered symbols in hard value comprises deploying RAKE or Generalized RAKE.

In yet another embodiment the step 101 of using the matrix X of de-spread symbols and the channel estimates $h_c$ from Common Pilot Channel, the modulation scheme information and the matrix S of recovered symbols in hard value output from the previous step to increase the estimation accuracy of the matrix S of recovered symbols in hard value comprises deploying Generalized RAKE.

In a still further embodiment the step 105 of using the impairment co-variance matrix $R_u$ estimate and the channel estimates $h_c$ from Common Pilot Channel to determine Generalized RAKE combining weight w and to estimate Common Pilot Channel Signal to Interference-plus-Noise Ratio comprises determining the Generalized RAKE combining weight w as $w=R_u^{-1}h_c$ and the Common Pilot Channel Signal to Interference-plus-Noise Ratio estimate $SINR_{cpich}$ as $SINR_{cpich}=16h_c^H R_u^{-1} h_c$.

Figure 3:
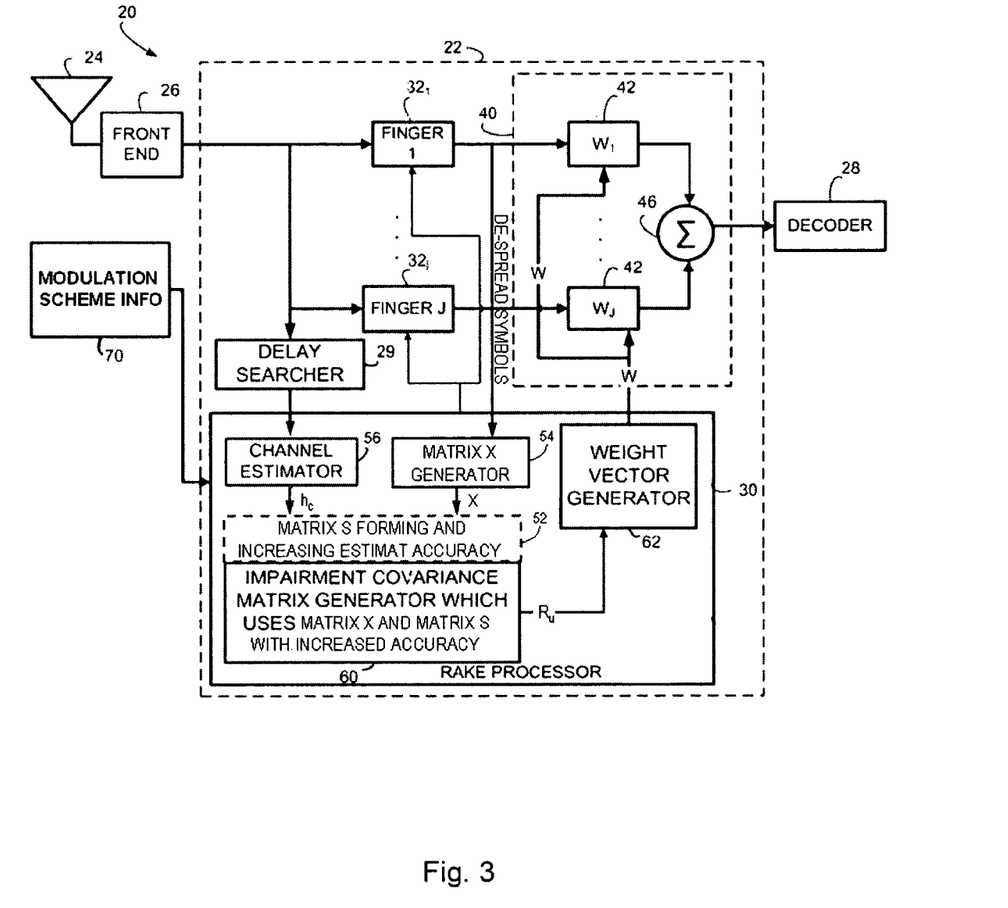
FIG. 3 a diagrammatic view of an example embodiment of an arrangement which employs the method of increasing impairment co-variance matrix estimation accuracy according to the present invention.

FIG. 3 illustrates a representative wireless receiver 20, e.g. as incorporated in a UE 18, including G-RAKE receiver 22 according to one example embodiment. The wireless receiver 20 comprises one or more receive antenna(s) 24; receiver front-end 26, G-RAKE receiver 22, and decoder 28. G-RAKE receiver 22 comprises delay searcher 29, G-RAKE processor 30, a plurality of G-RAKE fingers 32 (e.g., G-RAKE fingers $32_1$ through $32_j$), and weighting network 40.

Receiver front-end 26 filters, down-converts, and samples the receive signal from antenna (antennas) 24 to generate a baseband signal for processing. The sampling interval may, for example, be one-half the chip period $T_c$. The signal samples from receiver front-end 26 are input to one or more G-RAKE fingers $32_{1-j}$, whose function is to correlate with the spreading code.

Delay searcher 29 identifies the individual signal images in a received signal and determines the delay associated with each signal image. The G-RAKE fingers $32_{1-j}$ detect respective signal images in a multi-path signal. Each of the G-RAKE fingers $32_{1-j}$ is associated with a particular receive antenna and a specific processing delay. The specific processing delay for each G-RAKE finger $32_{1-j}$ is determined/assigned by G-RAKE processor 30 based on information supplied by delay searcher 29.

The weighting network 40 combines the outputs of the G-RAKE fingers $32_{1-j}$ to generate a combined G-RAKE output signal. Decoder 28 decodes the combined G-RAKE output signal.

Each G-RAKE finger $32_{1-j}$ comprises delay element and correlator. The delay element aligns each respective finger $32_{1-j}$ with a selected signal image by delaying the received signal by a configurable delay determined by G-RAKE processor 30. The correlator correlates the delayed signal with a known spreading sequence associated with a desired signal to despread the received signal. As a result of the correlation process, unwanted signals contained in the received signal appear as noise to the receiver.

Weighting network 40 weights and combines the despread signals output from the individual G-RAKE fingers $32_{1-j}$. Weighting elements 42 apply a weighted coefficient to respective G-RAKE finger outputs and G-RAKE combiner 46 combines the weighted G-RAKE output signals to generate a combined decision statistic, referred to herein as the G-RAKE output signal. The G-RAKE output signal is applied to decoder 28, which decodes the G-RAKE output signal to generate an estimate of the originally transmitted signal.

The impairment covariance matrix generator 60 of FIG. 3 is configured to make an estimation of an impairment covariance matrix used in turn to generate a weight vector.

Thus, according to further embodiments of the present invention is proposed an arrangement 20 which targets to improve robust G-RAKE performance in downlink at high geometry for moderate to high mobile speed in order to offer increased peak data rate.

In accordance with a first embodiment this is provided by an arrangement 20 of increasing impairment co-variance matrix $R_u$ estimation accuracy in downlink in a user equipment 18 in a communication network system comprising a plurality of communication network nodes 15a, 15b communicating with one or more user equipments 18, where each network node 15a, 15b is serving at least one cell 19 in which the user equipments 18 are situated. The arrangement 20 comprises: plural delay fingers $32_{1-j}$ configured to perform de-spread on High Speed-Downlink Shared Channel symbols to obtain de-spread symbols and a generator 54 configured to form a matrix X of the obtained de-spread symbols; a processor 30 for using 52 the matrix X of de-spread symbols and channel estimates $h_c$ from Common Pilot Channel and modulation scheme information to form a matrix S of recovered symbols in hard value (i.e. unit average symbol energy); said processor 30 further being arranged for using 52 the matrix X of de-spread symbols and the channel estimates $h_c$ from Common Pilot Channel, the modulation scheme information and the matrix S of recovered symbols in hard value output from the previous step to increase the estimation accuracy of the matrix S of recovered symbols in hard value; said processor 30 further being arranged for repeating the step 102 of using the matrix X of de-spread symbols and the channel estimates $h_c$ from Common Pilot Channel, the modulation scheme information and the matrix S of recovered symbols in hard value output from the previous step 102 to increase the estimation accuracy of the matrix S of recovered symbols in hard value until the output symbols are the same as the input symbols or the number of iterations reaches a pre-defined maximum value; a generator 60 configured to use the matrix X of de-spread symbols and the matrix S of recovered symbols in hard value with increased estimation accuracy to form an impairment co-variance matrix $R_u$ estimate; and said processor 30 further being arranged for, e.g. in a weight vector generator 62, using the impairment co-variance matrix $R_u$ estimate and the channel estimates $h_c$ from Common Pilot Channel to determine Generalized RAKE combining weight w and to estimate Common Pilot Channel Signal to Interference-plus-Noise Ratio.

In a further embodiment the arrangement 20 is arranged to handle a matrix X of de-spread symbols having a dimension of L-by-N, where L is the number of combining fingers $32_{1-j}$ and N is the number of de-spread symbols on each combining finger $32_{1-j}$ during one time slot.

In still a further embodiment the arrangement 20 is arranged to handle a number of de-spread symbols on each combining finger $32_{1-j}$ during one time slot N=160×K, where 160 is the number of symbols per code channel in one time slot and K is the number of codes employed for estimation.

In yet a further embodiment the arrangement 20 is arranged such that the number of codes employed for estimation K=$N_{code}$, such that all allocated codes are employed for estimation.

In yet still a further embodiment the arrangement 20 is arranged to use symbols corresponding to a few or all allocated Walsh codes to form the matrix X of de-spread symbols.

In a still further embodiment the arrangement 20 is arranged to deploy RAKE or Generalized RAKE in the step of using the matrix X of de-spread symbols and channel estimates $h_c$ from Common Pilot Channel and the modulation scheme information to form a matrix S of recovered symbols in hard value.

In yet a further embodiment the arrangement 20 is arranged to deploy Generalized RAKE in the step of using the matrix X of de-spread symbols and the channel estimates hc from Common Pilot Channel, the modulation scheme information and the matrix S of recovered symbols in hard value output from the previous step to increase the estimation accuracy of the matrix S of recovered symbols in hard value.

In still another embodiment the arrangement 20 is arranged to is arranged to determine the Generalized RAKE combining weight w as w=$R_u^{-1} h_c$ and the Common Pilot Channel Signal to Interference-plus-Noise Ratio estimate $SINR_{cpich}$ as $SINR_{cpich}=16 h_c^H R_u^{-1} h_c$ in the step of using the impairment co-variance matrix $R_u$ estimate and the channel estimates $h_c$ from Common Pilot Channel to determine Generalized RAKE combining weight w and to estimate Common Pilot Channel Signal to Interference-plus-Noise Ratio.

According to a further embodiment of the present invention is proposed a user equipment 18 which targets to improve robust G-RAKE performance in downlink at high geometry for moderate to high mobile speed in order to offer increased peak data rate.

In accordance with a first embodiment this is provided by a user equipment 18 for increasing impairment co-variance matrix $R_u$ estimation accuracy in downlink in a communication network system comprising communication network nodes 15a, 15b each serving at least one cell 19 in which the user equipments 18 are situated. The user equipment comprises: plural delay fingers $32_{1-j}$ configured to perform de-spread on High Speed-Downlink Shared Channel symbols to obtain de-spread symbols and a generator 54 configured to form a matrix X of the obtained de-spread symbols; a processor 30 for using 52 the matrix X of de-spread symbols and channel estimates $h_c$ from Common Pilot Channel and modulation scheme information to form a matrix S of recovered symbols in hard value (i.e. unit average symbol energy); said processor 30 further being arranged for using the matrix X of de-spread symbols and the channel estimates $h_c$ from Common Pilot Channel, the modulation scheme information and the matrix S of recovered symbols in hard value output from the previous step 102 to increase the estimation accuracy of the matrix S of recovered symbols in hard value; said processor 30 further being arranged for repeating the step 102 of using the matrix X of de-spread symbols and the channel estimates $h_c$ from Common Pilot Channel, the modulation scheme information and the matrix S of recovered symbols in hard value output from the previous step 102 to increase the estimation accuracy of the matrix S of recovered symbols in hard value until the output symbols are the same as the input symbols or the number of iterations reaches a pre-defined maximum value; a generator 60 configured to use the matrix X of de-spread symbols and the matrix S of recovered symbols in hard value with increased estimation accuracy to form an impairment co-variance matrix $R_u$ estimate; and said processor 30 further being arranged for, e.g. in a weight vector generator 62, using the impairment co-variance matrix $R_u$ estimate and the channel estimates $h_c$ from Common Pilot Channel to determine Generalized RAKE combining weight w and to estimate Common Pilot Channel Signal to Interference-plus-Noise Ratio.

In order to verify performance of the above proposed method, arrangement 20 and user equipment 18, applicant has performed link level simulations to check the performance for QPSK, 16QAM and 64QAM. It was assumed the UE 18 knows the used Walsh codes and the modulation scheme via reading HS-SCCH. The number of stages in the $R_u$ estimation was set to five.

Results of the performed link level simulations show that the proposed G-RAKE has very robust performance across different geometries, and more important, it is almost identical to an ideal G-RAKE at high geometry in the case of QPSK and 16QAM.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of increasing impairment co-variance matrix $R_u$ estimation accuracy in downlink in a user equipment in a communication network system comprising a plurality of communication network nodes communicating with one or more user equipments, where each network node is serving at least one cell in which one or more user equipments are located, the method comprising the steps of:

performing de-spread on high speed-downlink channel symbols to form a matrix X of de-spread symbols;

using the matrix X of de-spread symbols and channel estimates $h_c$ from common pilot channel and modulation scheme information to form a matrix S of recovered symbols in hard value;

using the matrix X of de-spread symbols and the channel estimates $h_c$ from common pilot channel, the modulation scheme information and the matrix S of recovered symbols in hard value output to increase the estimation accuracy of the matrix S of recovered symbols in hard value;

repeating the use of the matrix X of de-spread symbols and the channel estimates $h_c$ from common pilot channel, the modulation scheme information and the matrix S of recovered symbols in hard value output until the output symbols are the same as the input symbols or the number of iterations reaches a pre-defined maximum value;

using the matrix X of de-spread symbols and the matrix S of recovered symbols in hard value with increased estimation accuracy to form an impairment co-variance matrix $R_u$ estimate; and using the impairment co-variance matrix $R_u$ estimate and the channel estimates $h_c$ from common pilot channel to determine generalized RAKE combining weight w and to estimate common pilot channel signal to interference plus noise ratio.

2. The method according to claim 1, wherein the matrix X of de-spread symbols has a dimension of L-by-N, where L is the number of combining fingers and N is the number of de-spread symbols on each combining finger during one time slot.

3. The method according to claim 2, wherein the number of de-spread symbols on each combining finger during one time slot N=160×K, where 160 is the number of symbols per code channel in one time slot and K is the number of codes employed for estimation.

4. The method according to claim 3, wherein the number of codes employed for estimation K=$N_{code}$, such that all allocated codes are employed for estimation.

5. The method according to claim 1, wherein symbols corresponding to a few or all allocated Walsh codes are used to form the matrix X of de-spread symbols.

6. The method according to claim 1, wherein the step of using the matrix X of de-spread symbols and channel estimates $h_c$ from common pilot channel and the modulation scheme information to form a matrix S of recovered symbols in hard value comprises deploying RAKE or generalized RAKE.

7. The method according to claim 1, wherein the step of using the matrix X of de-spread symbols and the channel estimates hc from common pilot channel, the modulation scheme information and the matrix S of recovered symbols in hard value output to increase the estimation accuracy of the matrix S of recovered symbols in hard value comprises deploying generalized RAKE.

8. The method according to claim 1, wherein the step of using the impairment co-variance matrix $R_u$ estimate and the channel estimates $h_u$ from common pilot channel to determine generalized RAKE combining weight w and to estimate common pilot channel signal to interference plus noise ratio comprises determining the generalized RAKE combining weight w as $w=R_c^{-1}h_c$ and the common pilot channel signal to interference plus noise ratio estimate $SINR_{cpich}$ as $SINR_{cpich}=16h_c^H R_u^{-1} h_c$.

9. An arrangement of increasing impairment co-variance matrix $R_u$ estimation accuracy in downlink in a user equipment in a communication network system comprising a plurality of communication network nodes communicating with one or more user equipments, where each network node is serving at least one cell in which one or more user equipments are located, the arrangement comprising:

plural delay fingers configured to perform de-spread on high speed-downlink shared channel symbols to obtain de-spread symbols and a generator configured to form a matrix X of the obtained de-spread symbols;

a processor for using the matrix X of de-spread symbols and channel estimates $h_c$ from common pilot channel and modulation scheme information to form a matrix S of recovered symbols in hard value;

said processor further being arranged for using the matrix X of de-spread symbols and the channel estimates $h_c$ from common pilot channel, the modulation scheme information and the matrix S of recovered symbols in hard value to increase the estimation accuracy of the matrix S of recovered symbols in hard value;

said processor further being arranged for repeating using the matrix X of de-spread symbols and the channel estimates $h_c$ from common pilot channel, the modulation scheme information and the matrix S of recovered symbols in hard value to increase the estimation accuracy of the matrix S of recovered symbols in hard value until the output symbols are the same as the input symbols or the number of iterations reaches a pre-defined maximum value;

a generator configured to use the matrix X of de-spread symbols and the matrix S of recovered symbols in hard value with increased estimation accuracy to form an impairment co-variance matrix $R_u$ estimate; and said processor further being arranged for using the impairment co-variance matrix $R_u$ estimate and the channel estimates $h_c$ from common pilot channel to determine generalized RAKE combining weight w and to estimate common pilot channel signal to interference plus noise ratio.

10. The arrangement according to claim 9, arranged to handle a matrix X of de-spread symbols having a dimension of L-by-N, where L is the number of combining fingers and N is the number of de-spread symbols on each combining finger during one time slot.

11. The arrangement according to claim 9, arranged to handle a number of de-spread symbols on each combining finger during one time slot N=160–K, where 160 is the number of symbols per code channel in one time slot and K is the number of codes employed for estimation.

12. The arrangement according to claim 9, arranged such that the number of codes employed for estimation K=$N_{code}$, such that all allocated codes are employed for estimation.

13. The arrangement according to claim 9, arranged to use symbols corresponding to a few or all allocated Walsh codes to form the matrix X of de-spread symbols.

14. The arrangement according to claim 9, arranged to deploy RAKE or generalized RAKE in using the matrix X of de-spread symbols and channel estimates $h_c$ from common pilot channel and the modulation scheme information to form a matrix S of recovered symbols in hard value.

15. The arrangement according to claim 9, arranged to deploy generalized RAKE in using the matrix X of de-spread symbols and the channel estimates hc from common pilot channel, the modulation scheme information and the matrix S of recovered symbols in hard value to increase the estimation accuracy of the matrix S of recovered symbols in hard value.

16. The arrangement according to claim 9, arranged to determine the generalized RAKE combining weight w as $w=R_u^{-1}h_c$ and the common pilot channel signal to interference plus noise ratio estimate $SINR_{cpich}$ as $SINR_{cpich}=16h_c^H R_u^{-1} h_c$ in using the impairment co-variance matrix $R_u$ estimate and the channel estimates $h_c$ from common pilot channel to determine generalized RAKE combining weight w and to estimate common pilot channel signal to interference plus noise ratio.

17. A user equipment for increasing impairment co-variance matrix $R_u$ estimation accuracy in downlink in a communication network system comprising communication network nodes each serving at least one cell in which the user equipment is located, the user equipment comprising:

plural delay fingers configured to perform de-spread on high speed-downlink shared channel symbols to obtain de-spread symbols and a generator configured to form a matrix X of the obtained de-spread symbols;

a processor for using the matrix X of de-spread symbols and channel estimates $h_c$ from common pilot channel and modulation scheme information to form a matrix S of recovered symbols in hard value;

said processor further being arranged for using the matrix X of de-spread symbols and the channel estimates $h_c$ from common pilot channel, the modulation scheme information and the matrix S of recovered symbols in hard value to increase the estimation accuracy of the matrix S of recovered symbols in hard value;

said processor further being arranged for repeating using the matrix X of de-spread symbols and the channel estimates $h_c$ from common pilot channel, the modulation scheme information and the matrix S of recovered symbols in hard value to increase the estimation accuracy of the matrix S of recovered symbols in hard value until the output symbols are the same as the input symbols or the number of iterations reaches a pre-defined maximum value;

a generator configured to use the matrix X of de-spread symbols and the matrix S of recovered symbols in hard value with increased estimation accuracy to form an impairment co-variance matrix $R_u$ estimate; and said processor further being arranged for using the impairment co-variance matrix $R_u$ estimate and the channel estimates $h_c$ from common pilot channel to determine generalized RAKE combining weight w and to estimate common pilot channel signal to interference plus noise ratio.

* * * * *

UNITED STATES PATENT AND TRADEMARK OFFICE
CERTIFICATE OF CORRECTION

PATENT NO. : 8,897,339 B2  Page 1 of 1
APPLICATION NO. : 13/642116
DATED : November 25, 2014
INVENTOR(S) : Wang It is certified that error appears in the above-identified patent and that said Letters Patent is hereby corrected as shown below:

In the Specification

In Column 1, Line 52, delete "though" and insert -- through --, therefor.

In Column 4, Line 47, delete "FIG.3 a" and insert -- FIG.3 is a --, therefor.

In Column 5, Line 24, delete "stations" and insert -- stations 15 --, therefor.

In the Claims

In Column 11, Line 50, in Claim 8, delete "$h_u$" and insert -- $h_c$ --, therefor.

In Column 11, Line 54, in Claim 8, delete "$w=R_c^{-1}h_c$" and insert -- $w=R_u^{-1}h_c$ --, therefor.

In Column 12, Line 37, in Claim 11, delete "N=160-K," and insert -- N=160XK, --, therefor.

Signed and Sealed this
Twenty-ninth Day of September, 2015

Michelle K. Lee
*Director of the United States Patent and Trademark Office*